United States Patent
Nesbitt

(10) Patent No.: US 8,406,997 B2
(45) Date of Patent: Mar. 26, 2013

(54) SYSTEMS AND METHODS FOR IMPROVED GENERATION OF TEXTUAL DIRECTIONS BASED ON POSITIONAL INFORMATION

(75) Inventor: David W. Nesbitt, Port Deposit, MD (US)

(73) Assignee: MapQuest, Inc., Denver, CO (US)

( * ) Notice: Subject to any disclaimer, the term of this patent is extended or adjusted under 35 U.S.C. 154(b) by 782 days.

(21) Appl. No.: 12/458,545

(22) Filed: Jul. 15, 2009

(65) Prior Publication Data

US 2011/0015860 A1 Jan. 20, 2011

(51) Int. Cl.
*G01C 21/00* (2006.01)
(52) U.S. Cl. .......................................... 701/410
(58) Field of Classification Search .................. 701/400, 701/408, 410, 418, 421
See application file for complete search history.

(56) References Cited

U.S. PATENT DOCUMENTS

| 7,321,824 | B1 | 1/2008 | Nesbitt |
| 7,395,153 | B1 | 7/2008 | Nesbitt et al. |
| 7,474,960 | B1 | 1/2009 | Nesbitt |
| 7,561,965 | B1 | 7/2009 | Nesbitt et al. |
| 2007/0005238 | A1 | 1/2007 | Adachi |
| 2007/0150185 | A1* | 6/2007 | Nagase et al. ............... 701/209 |
| 2008/0114535 | A1 | 5/2008 | Nesbitt |
| 2008/0147313 | A1 | 6/2008 | Nesbitt |
| 2008/0201074 | A1* | 8/2008 | Bleckman et al. ............ 701/211 |
| 2009/0157292 | A1 | 6/2009 | Currie et al. |

FOREIGN PATENT DOCUMENTS

| EP | 1 804 223 A2 | 7/2007 |
| WO | WO 2008/100657 A1 | 8/2008 |

OTHER PUBLICATIONS

Notification of Transmittal of the International Search Report and the Written Opinion of the International Searching Authority dated Jun. 16, 2011, in corresponding International Application No. PCT/US2010/041920 (21 pages).

* cited by examiner

*Primary Examiner* — Kim T Nguyen
(74) *Attorney, Agent, or Firm* — Finnegan, Henderson, Farabow, Garrett & Dunner LLP

(57) ABSTRACT

Systems and methods are provided for providing improved generation of textual directions based on positional information. In an implementation, textual directions for traversing a path are generated based on positional information associated with the path. According to a method, positional information that specifies a longitude and latitude at a plurality of times is received and processed to generate a routing graph. The generated routing graph includes nodes and route links that connect the plurality of nodes. Textual directions are generated for traversing a path associated with the positional data, based in part on link information associated with the links of the generated routing graph.

28 Claims, 12 Drawing Sheets

400

{{LONG₁, LAT₁, T₁,...}, {LONG₂, LAT₂, T₂,...}, {LONG₃, LAT₃, T₃,...},...,

{{LONG₁₀₀, LAT₁₀₀, T₁₀₀,...}, {LONG₁₀₁, LAT₁₀₁, T₁₀₁,...}, {LONG₁₀₂, LAT₁₀₂, T₁₀₂,...},...,

{{LONG_{N-2}, LAT_{N-2}, T_{N-2},...}, {LONG_{N-1}, LAT_{N-1}, T_{N-1},...}, {LONG_N, LAT_N, T_N,...}}

SYSTEMS AND METHODS FOR IMPROVED GENERATION OF TEXTUAL DIRECTIONS BASED ON POSITIONAL INFORMATION

BACKGROUND

1. Technical Field

The present disclosure generally relates to techniques for generating and presenting textual directions for traversing a path through a geographic region. In particular, and without limitation, the present disclosure relates to systems and methods for providing improved techniques that generate textual directions based on positional information.

2. Background Information

Today, modules capable of receiving and capturing signals from a global positional position system (GPS) are incorporated into in many common electronic devices, including personal navigation systems, mobile telephones, smart phones, personal media players, watches, automotive navigation systems, laptop and notebook computers. In addition to conveying driving and/or walking directions to a user, these GPS-equipped devices can also receive and store GPS position data, such a latitude, longitude, and elevation, for future download and manipulation. For example, a bicyclist may use a GPS-equipped mobile telephone to record GPS position data throughout a scenic bicycle ride.

Further, electronic map displays are widely used to convey information about roads, traffic, buildings, landmarks, terrain, etc. related to a particular geographical region of interest. Because of their versatility, electronic map displays are incorporated in a variety of different computer systems and applications. For example, electronic map interfaces are available from variety of Internet resources for use by the public.

Such Internet-based electronic map displays often allow a user to upload and manipulate GPS position data after capture by a GPS-equipped personal electronic device. These resources can plot uploaded GPS data on corresponding street maps, topographical maps, and/or street images for viewing and subsequent transmittal to other users of GPS-equipped devices. For example, the bicyclist can upload recorded GPS data corresponding to the scenic ride, process that data, and share that data with others who use similar GPS-devices and are interested in path taken during the scenic ride.

However, there are drawbacks associated with these Internet-based resources. In particular, while these resources permit the display of stored GPS data on corresponding maps, these resources often lack a facility for directly translating uploaded GPS positional data into textual directions for traversing a corresponding path. As such, users of these resources may be limited in their ability to share information derived from uploaded GPS data with other interested parties.

In view of the foregoing, there is a need for improved systems and methods for automatically generating textual directions for traversing a route. Such systems and methods may be implemented in computer-based environments, such as the Internet and network environments that provide online content to users.

SUMMARY

Consistent with embodiments of the present invention, a computer-implemented method is provided for generating textual directions based on positional data. The method receives positional information, the positional information including a plurality of positional data elements that specify a longitude and latitude at a corresponding plurality of times. The method then processes the received positional information to generate a routing graph. The routing graph includes a plurality of nodes and one or more route links that connect the plurality of nodes, and the one or more route links are associated with corresponding link information. The method then generates textual directions for traversing a path based on the corresponding link information.

Consistent with additional embodiments of the present invention, an apparatus having a storage device and a processor coupled to the storage device is provided. The storage device stores a program for controlling the processor, and the processor, being operative with the program, is configured to receive positional information, the positional information including a plurality of positional data elements that specify a longitude and latitude at a corresponding plurality of times. The processor is further configured to process the received positional information to generate a routing graph. The routing graph includes a plurality of nodes and one or more route links that connect the plurality of nodes, and the one or more route links are associated with corresponding link information. The processor is configured to generate textual directions for traversing a path based on the corresponding link information.

Other embodiments of the present invention relate to a computer-readable medium with stored instructions that, when executed by a processor, perform a method for generating textual directions based on received positional data. The method receives positional information, the positional information including a plurality of positional data elements that specify a longitude and latitude at a corresponding plurality of times. The method then processes the received positional information to generate a routing graph. The routing graph includes a plurality of nodes and one or more route links that connect the plurality of nodes, and the one or more route links are associated with corresponding link information. The method then generates textual directions for traversing a path based on the corresponding link information.

It is to be understood that both the foregoing general description and the following detailed description are exemplary and explanatory only, and are not restrictive of the invention. Further, the accompanying drawings, which are incorporated in and constitute a part of this specification, illustrate embodiments of the invention and together with the description, serve to explain principles of the invention.

BRIEF DESCRIPTION OF THE DRAWINGS

FIG. 4 is an exemplary set of positional information, consistent with embodiments of the invention.

DESCRIPTION OF THE EMBODIMENTS

Reference will now be made in detail to embodiments of the invention, examples of which are illustrated in the accompanying drawings. The same reference numbers will be used throughout the drawings to refer to the same or like parts.

In this application, the use of the singular includes the plural unless specifically stated otherwise. In this application, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. Additionally, the section headings used herein are for organizational purposes only, and are not to be construed as limiting the subject matter described.

Figure 1:
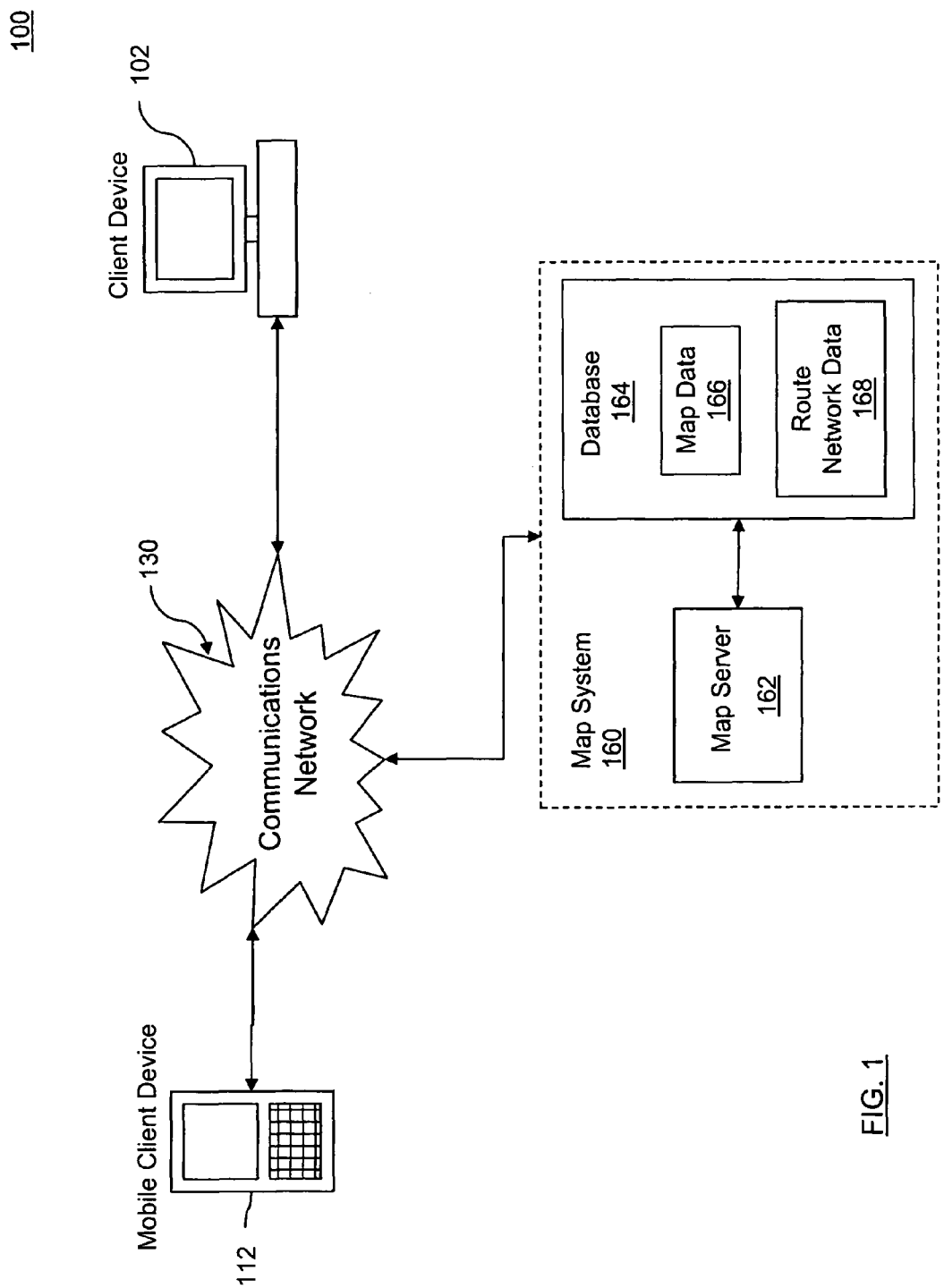
FIG. 1 is a diagram of an exemplary computing environment within which embodiments of the invention may be practiced.

FIG. 1 illustrates an exemplary computing environment 100 within which embodiments of the present invention may be practiced. In FIG. 1, a map system 160, a client device 102, and a mobile client device 112 are interconnected via a communications network 130. In an embodiment, client devices 102 and 112 can include, but are not limited to, a personal computer, a laptop computer, a notebook computer, a handheld computer, a personal digital assistant, a portable navigation device, a mobile phone, a smart phone, and any additional or alternate computing device apparent to a person of ordinary skill in the art. Although computing environment 100 includes multiple client devices in communication with map system 160, persons of ordinary skill in the art will recognize that computer environment 100 may include any number of additional number of mobile or stationary client devices, any number of additional map systems (or servers), and any additional number of computers, systems, or servers without departing from the spirit or scope of the present invention.

Communications network 130 may represent any form or medium of digital data communication. Examples of communication network 130 include a local area network ("LAN"), a wireless LAN, e.g., a "WiFi" network, a wireless Metropolitan Area Network (MAN) that connects multiple wireless LANs, and a wide area network ("WAN"), e.g., the Internet. In the embodiments described herein, the Internet may include any publicly-accessible network or networks interconnected via one or more communication protocols, including, but not limited to, hypertext transfer protocol (HTTP) and transmission control protocol/internet protocol (TCP/IP). Moreover, communications network 130 may also include one or more mobile device networks, such as a GSM network or a PCS network, that allow mobile devices, such as mobile client device 112, to send and receive data via applicable communications protocols, including those described above.

In FIG. 1, map system 160 includes a map server 162 and a map database 164, which is disposed in communication within map server 162. For example, map server 162 and map database 164 may be incorporated into a single hardware unit, for example, a single computer or a single server. In such an embodiment, map database 164 may be incorporated into, or stored within, a storage medium or storage device of map server 162, as described in FIG. 2. However, map server 162 and map database 164 are not limited to such configurations, and, in additional embodiments, map database 164 may reside on any additional or alternate computer or server accessible to map server 162 without departing from the spirit of scope of the present invention.

Map database 164 includes map data 166 and route network data 168. In an embodiment, map data 166 can include one or more of cartographic information, geographic information, road information, satellite image information, traffic information, and other information about one or more geographical regions. For example, such road information may include, but it not limited to, one or more names associated with a plurality of roads of a road network in a geographic region, and positional information, e.g., longitude, latitude, and/or elevation, of segments of the plurality of roads.

Route network data 168 may include information identifying one or more segments, or links, of routes for traversing the road network of the geographic region. For example, such identifying link information may include, but is not limited to, a length of one or more links, a direction of travel along the one or more links, names of the one or more links, connectivity information, and information describing a maneuver required to enter or exit the one or more links.

Figure 12:
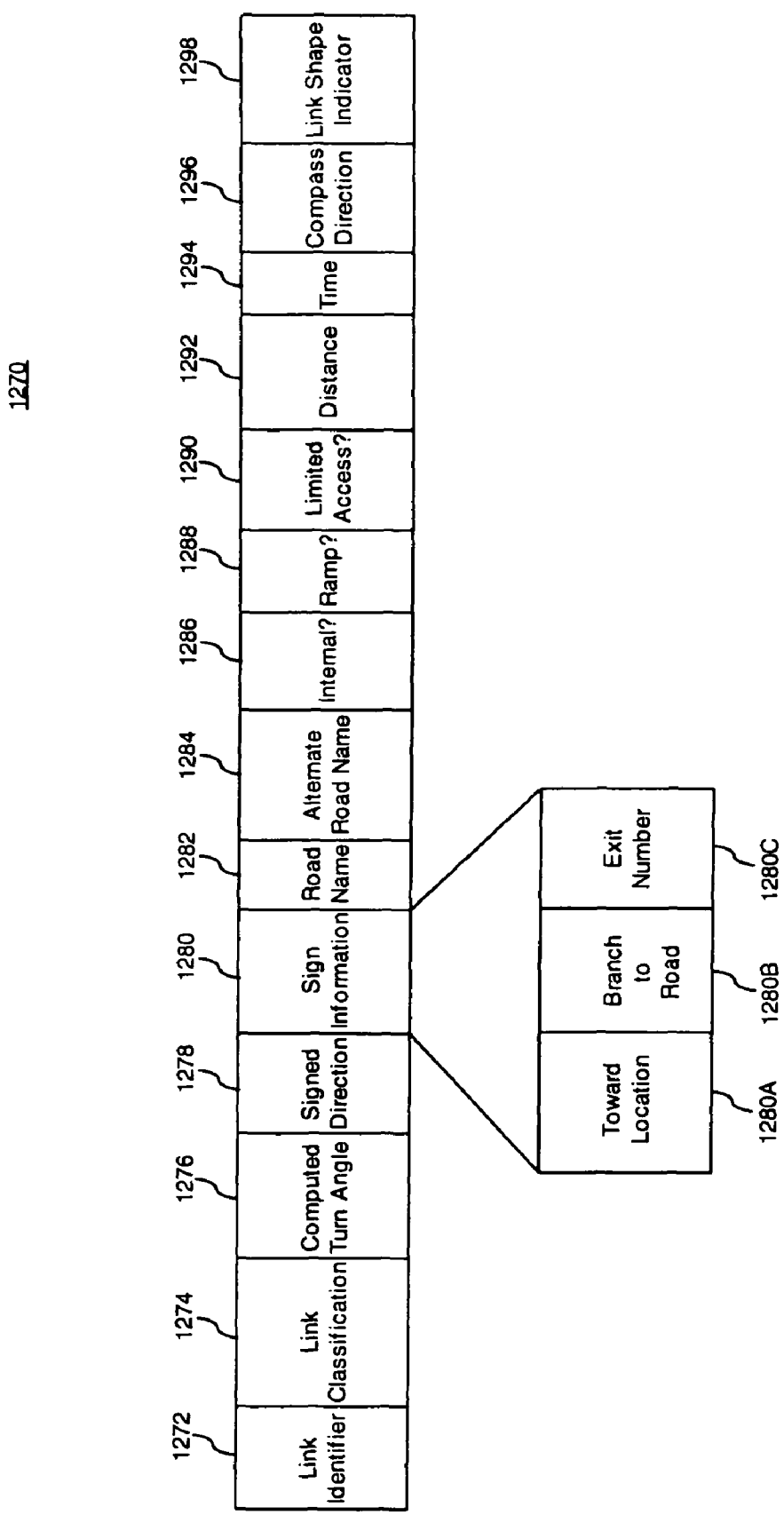
FIG. 12 illustrates an exemplary structure for storing road network data within the exemplary computing environment of FIG. 1, consistent with embodiments of the invention.

In an embodiment, information associated with links in route network data 168 may be stored within map database 164 in a structured format. FIG. 12 illustrates an exemplary data structure 1270 for storing link information associated with a particular route link in a road network. In an embodiment, link information associated with route links in route network data 168 may be stored in map database 164 according to data structure 1270.

In FIG. 12, link data structure 1270 includes a link identifier 1272, a link classification 1274, a computed turn angle 1276, a signed direction 1278, sign information 1280, a road name 1282, an alternate road name 1284, an internal link indicator 1286, a ramp indicator 1288, a limited-access indicator 1290, a distance 1292, an optional time 1294, and a compass direction 1296. Further, in FIG. 12, sign information 1280 may include a toward-location 1280A, a branch-to-road 1280B, and an exit number 1280C. However, link data structure 1270 is not limited to the attributes and properties described above, and in additional embodiments, link data structure 1270 may include any additional or alternate attributes or properties without departing from the spirit or scope of the invention.

In an embodiment, link identifier 1272 uniquely identifies a particular link, and link classification 1274 identifies a type of road corresponding to that particular link. The type of road may include, but is not limited to, a fully-controlled limited access highway, a partially-controlled limited access highway, an arterial road, or a local road.

Computed turn angle 1276 indicates a degree of an angle involved in a turn from the particular link to another link in the road network. For example, computed turn angle 1276 may include, but is not limited to, a sharp left, a sharp right, a slight left, a slight right, a merge, straight, and any additional or alternate turn angle apparent to a person or skill in the art.

Signed direction 1278 represents a travel direction of a road in the road network that corresponds to the particular link, as indicated by, for example, posted signs along the road. In such an embodiment, signed direction 1278 can include, but is not limited to, one of north, south, east or west.

Sign information 1280 may indicate information about one or more exit signs associated with the particular link. In an embodiment, sign information 1280 includes an indicator, e.g., toward-location 1280A, that identifies a city name or road name occurring along the road to which the exit applies, an indicator, e.g., branch-to-road indicator 1280B, that identifies the road to which the exit applies, and an exit number for the exit, e.g., exit number 1280C.

In an embodiment, components 1280A, 1280B, and 1280C of sign information 1280 can describe sign information characteristic of an exit sign on a limited-access highway. For example, such an exit sign may indicate that exit "21A" branches to "I-95 North" toward "New York." In such an embodiment, the toward-location 1280A would be "New York," the branch-to-road indicator 1280B would be "I-95 North," and the exit number 1280C would be "21A."

In an additional embodiment, a link within the road network may include sign information 1210 that corresponds to one or more signs. For example, "I-95 North" may have multiple exit signs, each having corresponding sign information, e.g., sign information 1280, and corresponding components 1280A, 1280B, and 1280C.

Road name 1282 indicates a name of the road that corresponds to the particular link. In an embodiment, link classification 1274, signed direction 1278, and road name 1280 collectively identify that road in the road network associated with the particular link. For example, a particular road may be named "I-295 South." In such an embodiment, the link classification 1274 may be "fully-controlled Limited Access Highway," the signed direction 1278 may be "south," and the road name 1280 may be "295."

Alternate road name 1284 indicates an alternate name of that road having road name 1282, when such an alternate name exists. For example, a road may have an alphabetical name (e.g., "Brandywine Road"), a road number assigned by a state highway authority (e.g., "MD-381"), and additionally or alternatively, a road number assigned by a national highway authority. Further, alternate road name 1282 may indicate multiple alternative road names associated with the particular road.

Internal link indicator 1286 may identify whether the particular link is an "internal link." In an embodiment, an internal link represents a link occurring at an intersection of two or more doubly-digitized roads, i.e., two-way roads represented as two separate roads. For example, a doubly-digitized road, such as "Interstate-95," may be represented as "Interstate-95 North" and "Interstate-95 South."

Ramp indicator 1288 identifies whether the particular link corresponds to a ramp of a road, and limited-access indicator 1290 identifies whether the particular link corresponds to a limited-access road. For example, an interstate highway may be characterized as a "fully-controlled limited-access road" in which access to and from the interstate occurs through a highway interchange, and not through a direct intersection of two roads. In such an embodiment, such a highway interchange may include includes one or more exits and ramps.

Distance 1292 identifies a length of a segment of the road corresponding to the particular link, and optional time 1294 identifies an average time for traversing distance 1292. Further, compass direction 1296 identifies a general direction of travel of a GPS-equipped device on the road corresponding to the particular link. In an embodiment, compass direction 1296 may be identical to, or different from, signed direction 1276 of the particular link.

Link shape indicator 1298 identifies a sequentially-ordered set of positions that fall along a curve or shape of a road associated with the particular link. For example, each of the identified positions may include a latitude and a longitude of the corresponding position along the particular link. However, in additional embodiments, the sequentially-ordered set of positions may also include additional quantifies, such as an elevation of a position along the particular link, without departing from the spirit or scope of the invention.

Figure 2:
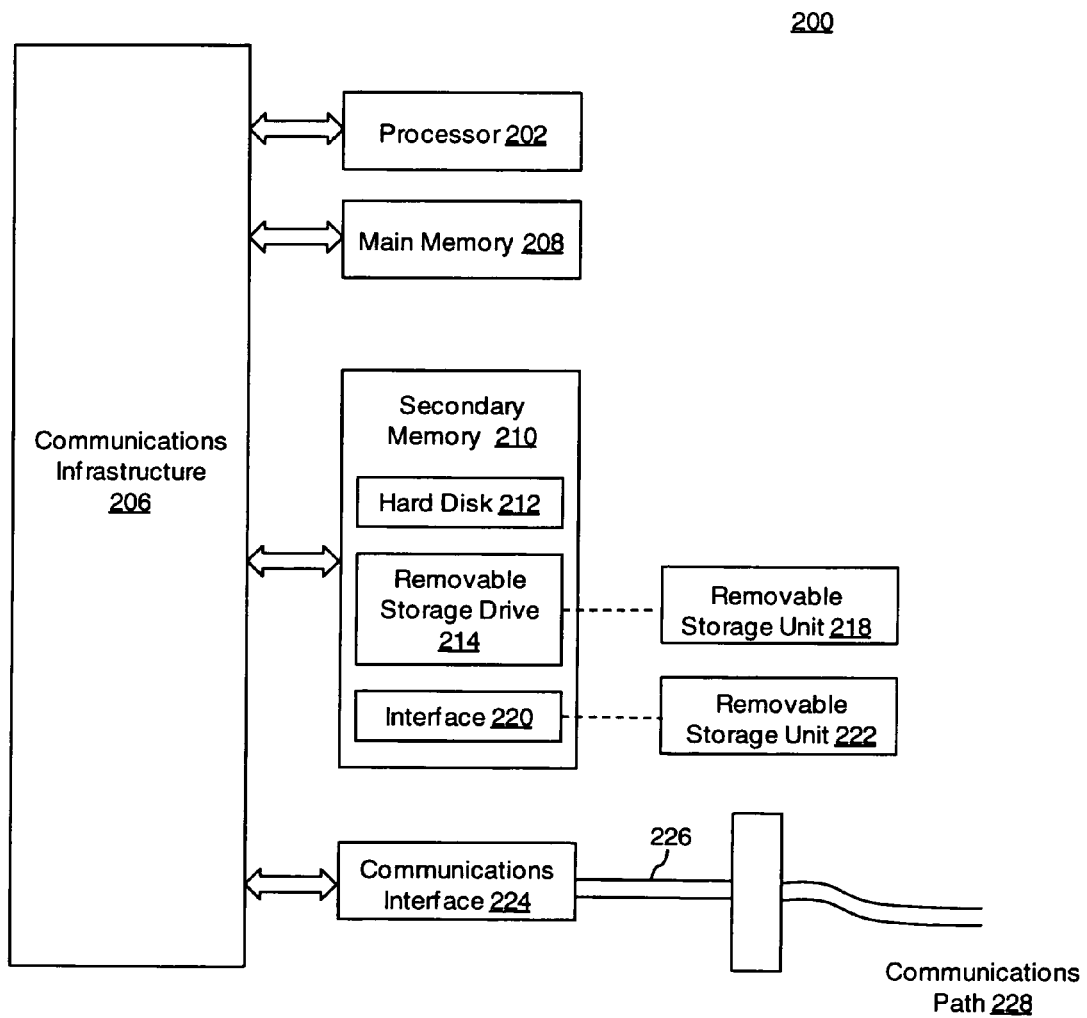
FIG. 2 is a diagram of an exemplary computer system, consistent with embodiments of the invention.

Referring back to FIG. 1, client devices 102 and 112, and map server 162, may represent any type of computer system capable of performing communication protocol processing. FIG. 2 is an exemplary computer system 200, according to an embodiment of the invention. Computer system 200 includes one or more processors, such as processor 202. Processor 202 is connected to a communication infrastructure 206, such as a bus or network, e.g., network 130 of FIG. 1.

Computer system 200 also includes a main memory 208, for example, random access memory (RAM), and may include a secondary memory 210. Secondary memory 210 may include, for example, a hard disk drive 212 and/or a removable storage drive 214, representing a magnetic tape drive, an optical disk drive, CD/DVD drive, etc. The removable storage drive 214 reads from and/or writes to a removable storage unit 218 in a well-known manner. Removable storage unit 218 represents a magnetic tape, optical disk, or other computer-readable storage medium that is read by and written to by removable storage drive 214. As will be appreciated, the removable storage unit 218 can represent a computer-readable medium having stored therein computer programs, sets of instructions, code, or data to be executed by processor 202.

In alternate embodiments, secondary memory 210 may include other means for allowing computer programs or other program instructions to be loaded into computer system 200. Such means may include, for example, a removable storage unit 222 and an interface 220. An example of such means may include a removable memory chip (e.g., EPROM, RAM, ROM, DRAM, EEPROM, flash memory devices, or other volatile or non-volatile memory devices) and associated socket, or other removable storage units 222 and interfaces 220, which allow instructions and data to be transferred from the removable storage unit 222 to computer system 200.

Computer system 200 may also include one or more communications interfaces, such as communications interface 224. Communications interface 224 allows software and data to be transferred between computer system 200 and external devices. Examples of communications interface 224 may include a modem, a network interface (e.g., an Ethernet card), a communications port, a PCMCIA slot and card, a wireless transmitter or card, etc. Software and data may be transferred via communications interface 224 in the form of signals 226, which may be electronic, electromagnetic, optical or other signals capable of being received by communications interface 224. These signals 226 are provided to communications interface 224 via a communications path (i.e., channel 228). Channel 228 carries signals 226 and may be implemented using wire or cable, fiber optics, an RF link, wireless transmissions, and other communications channels. In an embodiment of the invention, signals 226 comprise data packets sent to processor 202. Information representing processed packets can also be sent in the form of signals 226 from processor 202 through communications path 228.

The terms "storage device" and "storage medium" may refer to particular devices including, but not limited to, main memory 208, secondary memory 210, a hard disk installed in hard disk drive 212, and removable storage units 218 and 222. Further, the term "computer-readable medium" may refer to devices including, but not limited to, a hard disk installed in hard disk drive 212, any combination of main memory 208 and secondary memory 210, and removable storage units 218 and 222, which respectively provide computer programs and/ or sets of instructions to processor 202 of computer system 200. Such computer programs and sets of instructions can be stored within one or more computer readable media. Additionally or alternatively, computer programs and sets of instructions may also be received via communications interface 224 and stored on the one or more computer readable media.

Such computer programs and instructions, when executed by processor 202, enable processor 202 to perform one or more of the computer-implemented methods described herein. Examples of program instructions include, for example, machine code, such as that code produced by a compiler, and files containing a high-level code that can be executed by processor 202 using an interpreter.

The computer-implemented methods described herein can also be implemented on a single processor of a computer system, such as processor 202 of system 200. In another embodiment, computer-implemented methods consistent with embodiments of the invention may be implemented using one or more processors within a single computer system, and additionally or alternatively, these computer-implemented methods may be implemented on one or more processors within separate computer systems linked via a network.

Although not depicted in FIGS. 1 and 2, a client device, such as client devices 102 and 112, may be equipped with a receiver configured to interact with a global positioning system (GPS) and receive data regarding a position of the receiver at a particular time, that is, a "time stamp." In an embodiment, the received position data may represent a longitude and latitude of the GPS receiver. However, the received data is not limited to these values, and in additional embodiments, the received position data may include a current elevation of the GPS receiver and derived quantities, such as a speed of the GPS receiver and a travel direction of the GPS receiver, without departing from the spirit or scope of the invention.

Moreover, GPS-equipped client devices may be configured to store the continuously-received sets of position data, along with the corresponding time stamp. For example, these client devices can locally store the received position and time stamp data on a storage device or storage medium, such as secondary memory 200 of FIG. 2. Further, these GPS-equipped client devices may be portable, for example, as carried by an individual on foot, on a bicycle, or in a moving vehicle. Thus, these GPS-equipped devices are capable of recording position data while traversing a particular path a over period of time, thereby generating a set of positional information corresponding to a path over which the GPS-equipped device travelled.

Further, a user of such a GPS-equipped client device may wish to share a set of recorded positional information with other interested parties. For example, a cyclist may wish to share GPS-derived path data representative of his training rides with a fellow rider. Further, for example, drivers of fleet and/or delivery vehicles may share delivery routes with other drivers. In such embodiments, these parties may desire textual directions that describe one or more maneuvers necessary to traverse a path or route corresponding to the recorded positional information. However, such textual directions may not available from conventional mapping systems based on inputs of raw positional data alone.

Figure 3:
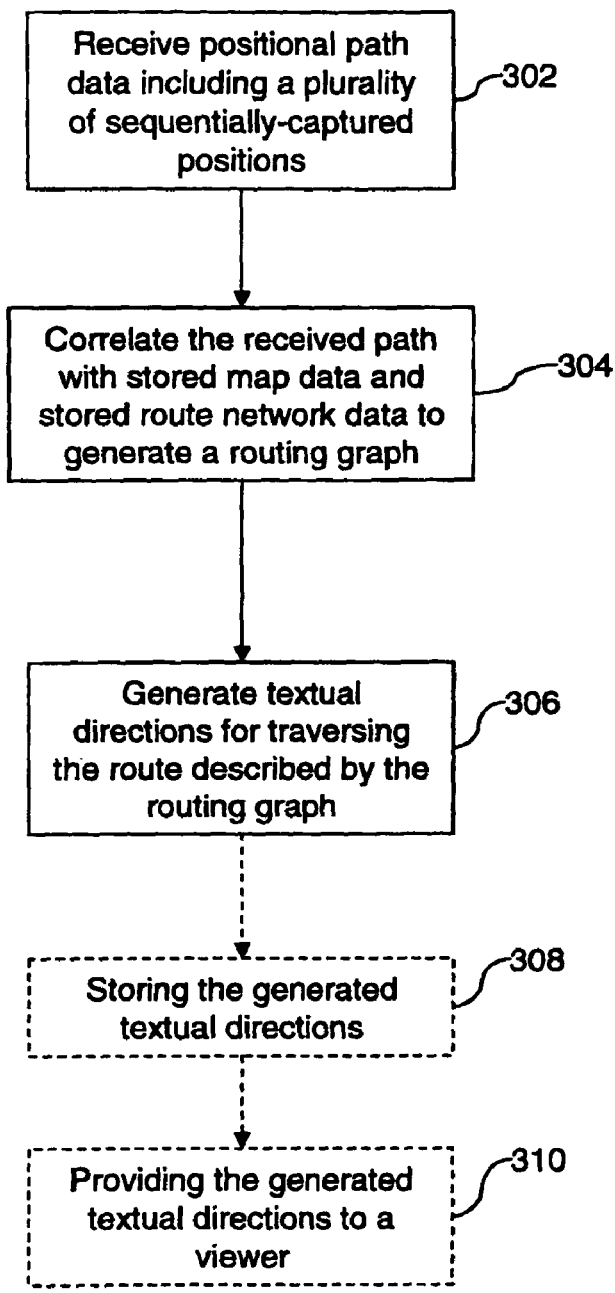
FIG. 3 is a flowchart of an exemplary method for generating textual directions based on positional information, according to an embodiment of the invention.

FIG. 3 illustrates an exemplary method for generating textual directions from positional information, according to an embodiment of the invention. In FIG. 3, a set of positional information is received in step 302 by a map system, such as map system 160 of FIG. 1. In an embodiment, and as described above, the positional information may include a plurality of data elements received and captured by a GPS-equipped device, and these data elements may be ordered sequentially according to a received time stamp.

For example, each of the stored data elements can include a time stamp associated with the data element, a latitude of the GPS-equipped device, and a longitude of the GPS-equipped device. However, in additional embodiments, the plurality of data elements may include additional information, for example, an elevation of the GPS-equipped device and derived quantities, such as a speed of the GPS-equipped device and a compass direction of the GPS-equipped device, without departing from the spirit or scope of the present invention.

FIG. 4 illustrates exemplary an exemplary set of positional information 400, consistent with embodiments of the invention. In an embodiment, positional information 400 may have been captured and locally stored by a GPS-equipped client device, such as client devices 102 and 112 of FIG. 1, and may have been received at the map server in step 302 of FIG. 3.

In FIG. 4, positional information 400 includes N individual positional data elements ordered sequentially according to a time stamp associated with each data element. For example, positional data element 402 includes a latitude $LAT_1$ and a longitude $LONG_1$ of the GPS-equipped client device at a time $T_1$. Similarly, for example, subsequent positional data element 404 includes a latitude $LAT_2$ and a longitude $LONG_2$ of the GPS-equipped client device at a time $T_2$, wherein $T_2$ is later than $T_1$. Further, positional data element 406 of the GPS-equipped client device includes a latitude $LAT_N$ and a longitude $LONG_N$ of the GPS-equipped device at time $T_N$, which is later than both $T_1$ and $T_2$. Moreover, as described above, each positional data element within set 400 may include additional information, such as an elevation, and one or more derived quantities, such as a speed and/or a direction of travel.

Referring back to FIG. 3, in an embodiment, step 302 receives positional information 400 in a standardized file format compatible with both the GPS-equipped client device and the map server. For example, positional information 400 may be provided to the map server in GPS eXchange (GPX) format, or alternatively, in Keyhole Markup Language. However, in additional embodiments, positional information 400 may be provided to the map server in any of a number of additional or alternate file formats compatible with the map server and the GPS-equipped device without departing from the spirit or scope of the present invention.

The received positional information is correlated in step 304 with stored map data (e.g., map data 166 of FIG. 1) and stored route network data (e.g., route network data 168 of FIG. 1) to generate a routing graph representative of the received positional information. For example, step 304 may process positional information, e.g., longitude and latitude, associated with one or more data elements in the received positional information to identify a set of route links associated with these one or more data elements. Step 304 then accesses link information associated with these identified route links, and processes the link information to generate a routing graph that connects the identified route links, thereby forming a corresponding route.

In additional embodiment, step 304 may also process the identified route links to eliminate "short loops" from the generated routing graph. In an embodiment, a "short loop" along the corresponding route represents a temporary reversal in direction along a single segment of road, i.e., along a single route link. For example, a short loop within a route traversed by a bicyclist can represent a bicyclist doubling back on a segment of road to wait for other riders. In such an embodiment, step 304 may identify and eliminate a route link or links associated with these "short loops," and subsequently reconnect the remaining route links to generate the routing graph.

Figure 5:
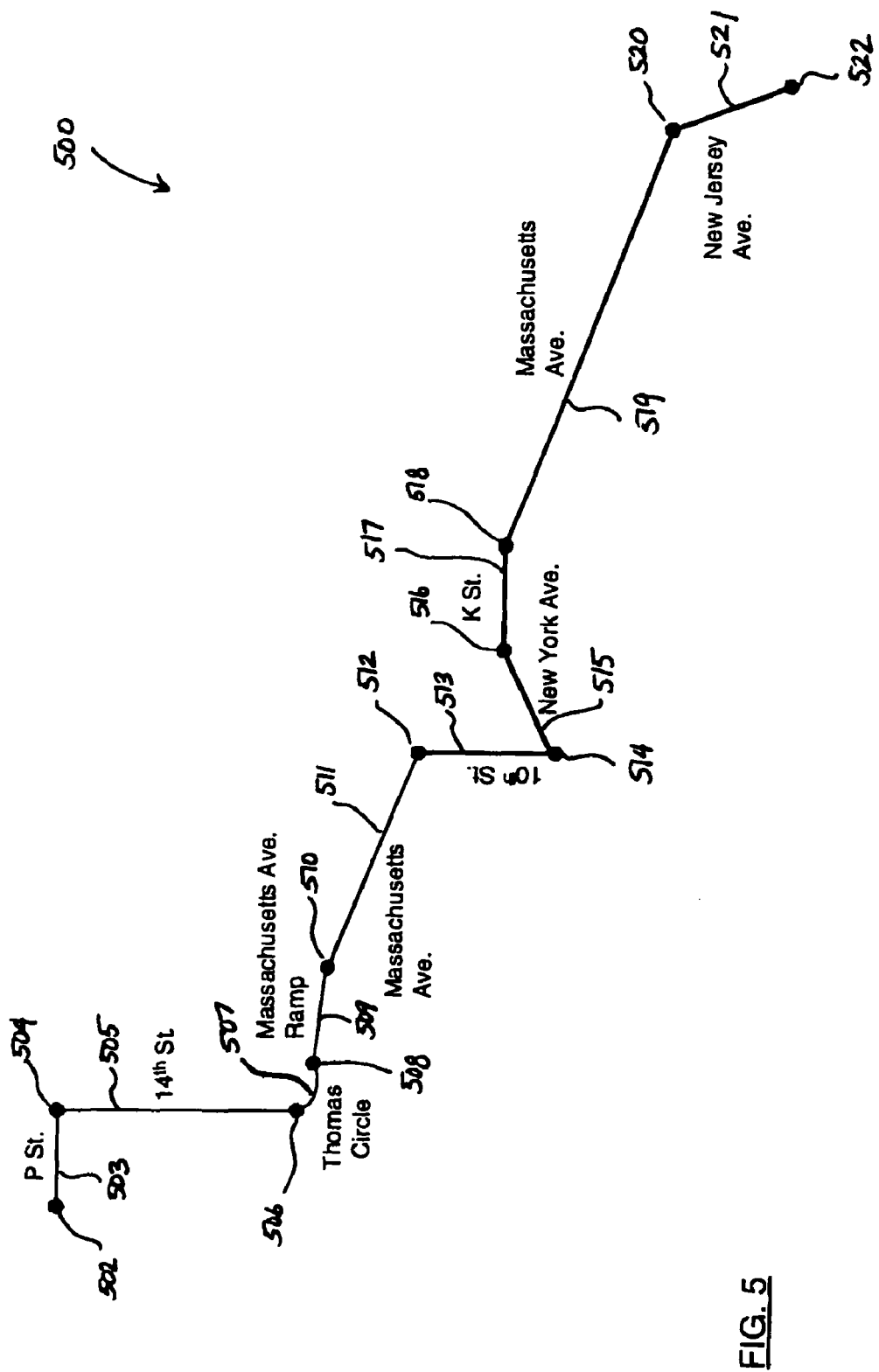
FIG. 5 is an exemplary routing graph, consistent with embodiments of the invention.

FIG. 5 illustrates an exemplary routing graph 500, consistent with embodiments of the present invention. In an embodiment, routing graph 500 may be generated by step 304 through the correlation of received positional information, e.g., positional information 400 of FIG. 4, with stored map data and stored route network data. In the embodiment of FIG. 5, the received positional information can include a plurality of positions received and stored by a GPS-equipped client device as that device travels along a path from "P St." to "New Jersey Ave."

Routing graph 500 extends from an origin node 502 on "P St.," e.g., an initial element within the received positional information, to a destination node 522 on "New Jersey Ave.," e.g., a final element within the received positional information. In an embodiment, routing graph 500 can be described in terms of a set of links, e.g., the route links identified in step 304, that are connected by corresponding nodes. For example, routing graph 500 includes origin node 502, interior nodes 504, 506, 508, 510, 512, 514, 516, 518, 520, and destination node 522. Further, routing graph 500 also includes links 503, 505, 507, 509, 511, 513, 515, 517, 519, and 521 that connect the nodes.

In an embodiment, a node on routing graph 500 can represent an intersection of directly-connected roads, which are represented by adjacent links. For example, node 512, which connects links 511 and 513, can represent the intersection of "Massachusetts Ave." and "10$^{th}$ St.," which are directly connected.

Referring back to FIG. 3, step 306 then processes the routing graph, e.g., routing graph 500 of FIG. 5, to generate textual directions for traversing the route represented by the routing graph. In an embodiment, step 306 processes and selectively combines the link information associated with the links of the routing graph to generate a preliminary list of maneuvers for the route. As described above, such link information may be stored within route network data 168 of FIG. 1. Step 306 may then process and selectively combines the preliminary list of maneuvers to generate a list of processed maneuvers, from which the mapping system generates textual directions.

Figure 6:
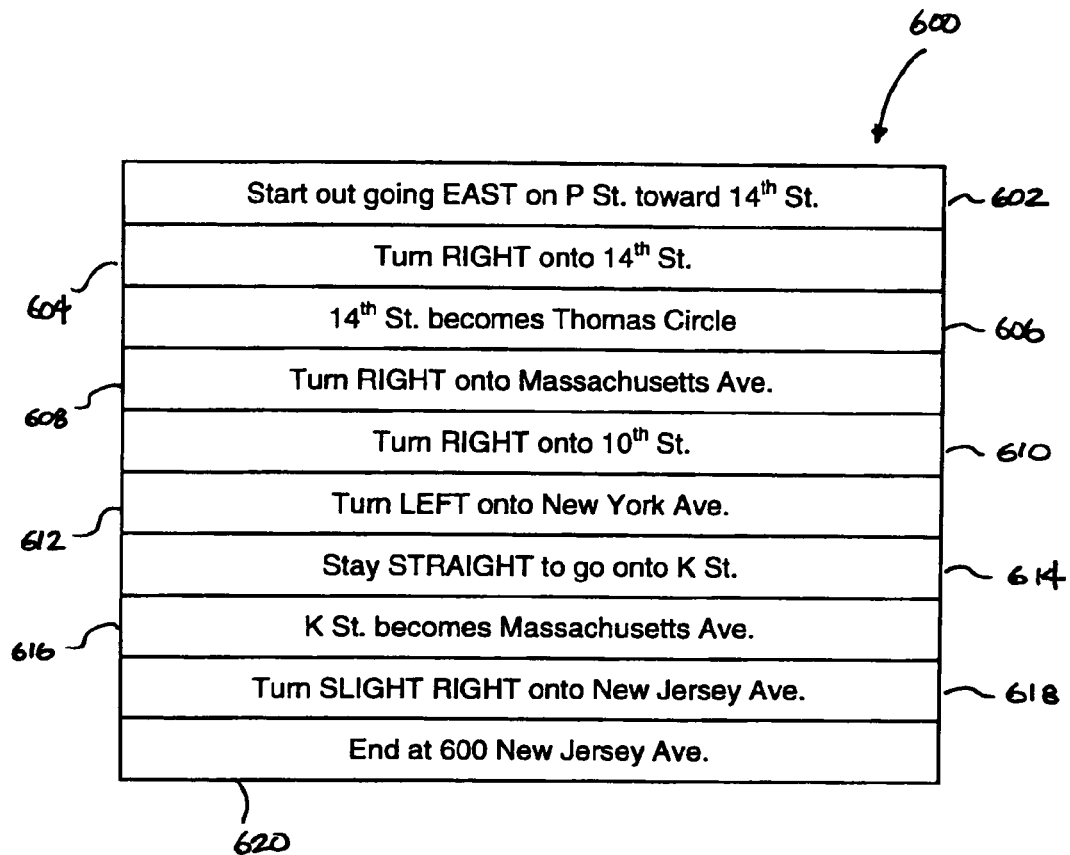
FIG. 6 is an exemplary set of textual directions, consistent with embodiments of the invention.

FIG. 6 illustrates exemplary textual directions 600 for traversing the correlated route of FIG. 5, according to an embodiment of the invention. In an embodiment, textual directions 600 are generated using the exemplary processes of step 306 of FIG. 3, as described above. In FIG. 6, textual directions 600 include narrative texts 602 through 620, which respectively describe a single maneuver necessary to traverse one or more route links of the generated routing graph, e.g., routing graph 500 of FIG. 5. Further, in the embodiment of FIG. 6, a first narrative text 602 describes a maneuver corresponding to an initial position within the routing graph, e.g., node 502 of FIG. 5, and a final narrative text 620 describes a maneuver that positioned the GPS-equipped client device at the final position within the routing graph, e.g., node 522 of FIG. 5.

Referring back to FIG. 3, the textual directions generated in step 306 may be stored in step 308 and may be transmitted and displayed to an additional party in step 310. In an embodiment, the map system, e.g., map system 160 of FIG. 1, can locally store the textual directions and any combination of the corresponding routing graph and the corresponding received positional information for future retrieval across a communications network, e.g., communications network 130 of FIG. 1. For example, the map server may make such stored information available for retrieval by the party who transmitted the GPS positional information to the map server, and additionally or alternatively, may make the stored information generally available to other parties through, for example, a web site and corresponding web service. Further, in an embodiment, step 310 may transmit the generated textual directions using any form apparent to a person of ordinary skill in the art, including, but not limited to, email messages and text messages.

Figure 7:
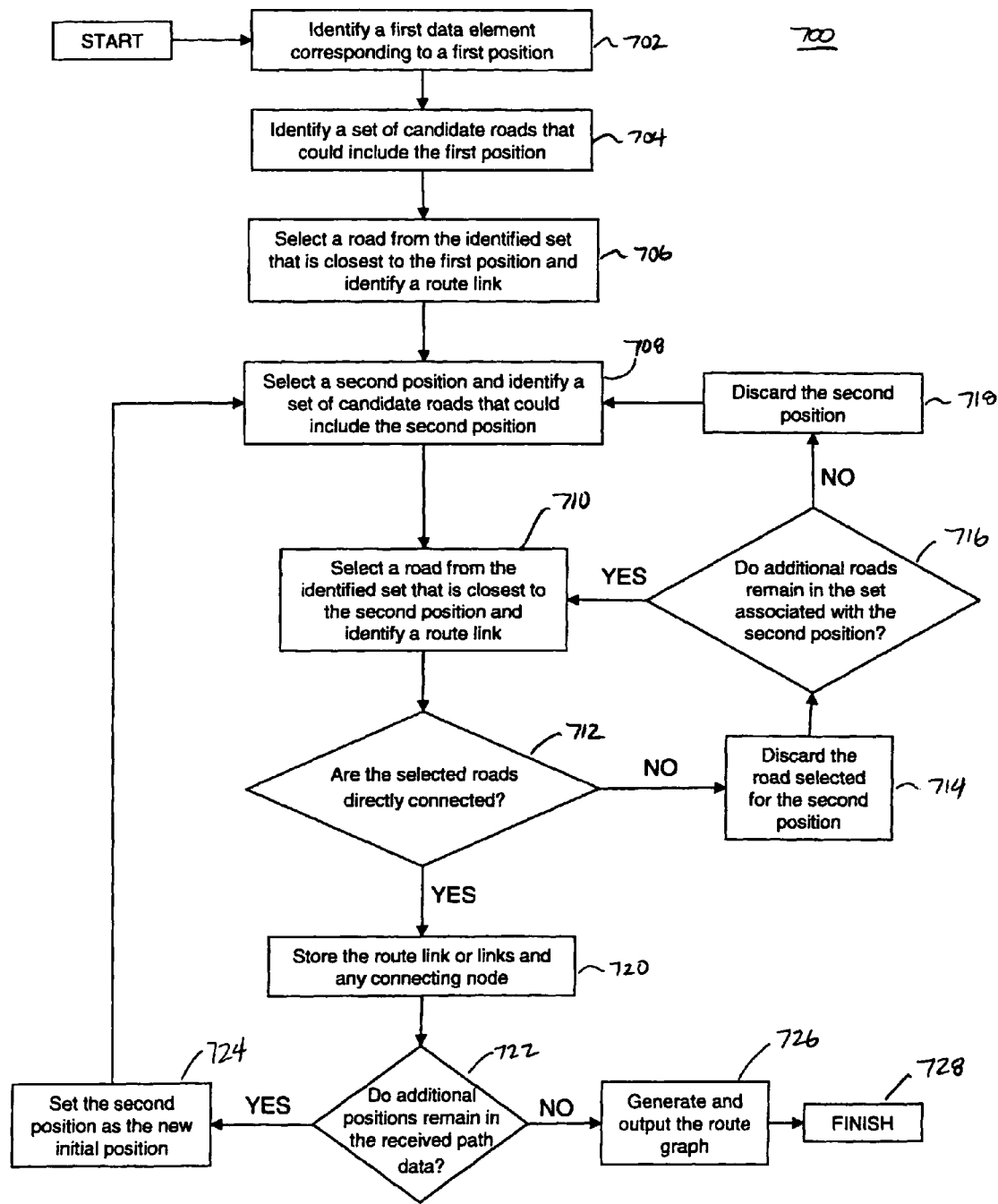
FIG. 7 is a flowchart of an exemplary method for generating a routing graph based on positional information, according to an embodiment of the invention.

FIG. 7 illustrates an exemplary method 700 for generating a routing graph based on received positional information, according to an embodiment of the invention. In an embodiment, method 700 is implemented as part of step 304 of FIG. 3 to generate a routing graph based on a correlation of received positional information with stored map data and stored route network data. However, in additional embodiments, method 700 may be independently implemented to generate a routing graph corresponding to any additional or alternate set of position data that includes latitude and longitude data associated with individual time stamps.

In FIG. 7, step 702 processes the received positional information to identify a first data element associated with a first position captured at a corresponding first time. For example, the first data element may represent an initial data element within the received positional information, e.g., data element 402 of FIG. 4. However, method 700 is not limited to such first data elements, and in additional embodiments, the first data element, may represent any additional data element from within the received positional information, e.g., a data element captured at a particular time, without departing from the spirit or scope of the invention.

Step 704 then identifies a set of candidate roads within a stored road network, e.g., map data 172 of FIG. 1, that are proximate to the first position (e.g., those roads having corresponding curves or shapes that are proximate to the first position). In an embodiment, the set of candidate roads may include one or more roads within the stored road network having any segment falling within a specified threshold distance of the first position. For example, step 704 may compute a separation distance between the first position and at least one position along one or more roads in the stored road network. Step 704 may then include a road within the set of candidate roads when the separation distance associated with that road falls below the specified threshold distance, e.g., ten meters, twenty-five meters, or any additional or alternate distance apparent to one of skill in the art.

Step 706 then selects the road from within the identified set of candidate roads having a minimum separation distance (i.e., the road that is closest to the first position), and then indexes this selected candidate road against stored route network data, e.g., route network data 174 of FIG. 1, to identify a route link associated with the selected candidate road. In an embodiment, step 706 may index the selected candidate road by matching a name of the candidate road against corresponding road names and/or alternate road names within stored route network data 168 to a identify the route link.

As described above in reference to FIG. 12, the selected route link may be associated with a link identifier that points to additional information related to the link. Such additional information may include, but is not limited to, a length of the identified route link, a direction of travel along a road corresponding to the identified route link, a name of a road corresponding to the identified route link, connectivity information, and information describing a maneuver required to enter or exit from the identified route link.

Once step 706 identifies a route link associated with the initial position of the received positional information, step 708 processes the received positional information to identify a second data element corresponding to a second position captured at a time after the first time. Step 708 also identifies a set of candidate roads within the stored road network that are proximate to the second position (e.g., those roads having corresponding curves or shapes that are proximate to the first position). As described above, step 708 may compute a separation distance between the second position and at least one position along one or more roads in the stored road network. Step 708 may then include a road in the set of candidate roads when the separation distance associated with that road falls below a specified threshold distance, e.g., ten meters, twenty-five meters, or any additional or alternate distance apparent to one of skill in the art.

In an embodiment, the second data element may represent a data element captured by a GPS-equipped client device immediately after the first data element. However, method 700 is not limited to such second data elements, and in additional embodiments, the second data element may represent any additional or alternate data element captured later than the first data element. For example, the second data element may be separated from the first data element by a particular number of elements or by a particular time.

Step 710 then selects the road from within the identified set of candidate roads having a minimum separation distance (i.e., the road that is closest to the second position). Step 710 then indexes this selected candidate road against stored route network data, e.g., route network data 168 of FIG. 1, to identify a route link associated with the selected candidate road. In an embodiment, step 710 may index the selected candidate road by matching a name of the candidate road against corresponding road names and/or alternate road names within stored route network data 168 to a identify the route link.

Moreover, in an embodiment, the identification of a route link in step 710 may also determine whether a travel direction associated with the identified route link matches a travel direction at the second position. For example, if the received positional information indicates the GPS-equipped client device was travelling eastbound at the second position, step 710 may not correlate that second position with a route link to a westbound road (e.g., a westbound portion of a fully-controlled, limited access highway) even if that road best approximates the second position. In such embodiments, step 710 may then select an alternate road from within the set of candidate roads having a direction that matches the travel direction of the second position.

However, in additional embodiments, the determination and remediation of directional mismatches may be predicated on a nature of the received positional information. For example, if the received positional information corresponds to a path traversed by an individual on foot, then a directional mismatch may not be relevant and step 710 may not perform an alternate selection. However, if the received positional information corresponds to a path traversed by a bicyclist or by a motor vehicle, then a direction mismatch may be relevant, and step 710 may make an alternate road selection.

Step 712 then determines whether the roads selected for the first and second positions are directly connected. In an embodiment, step 710 determines that the selected roads are directly connected when these selected roads satisfy certain connectivity criteria, such as those described below in reference to FIG. 8.

Figure 8:
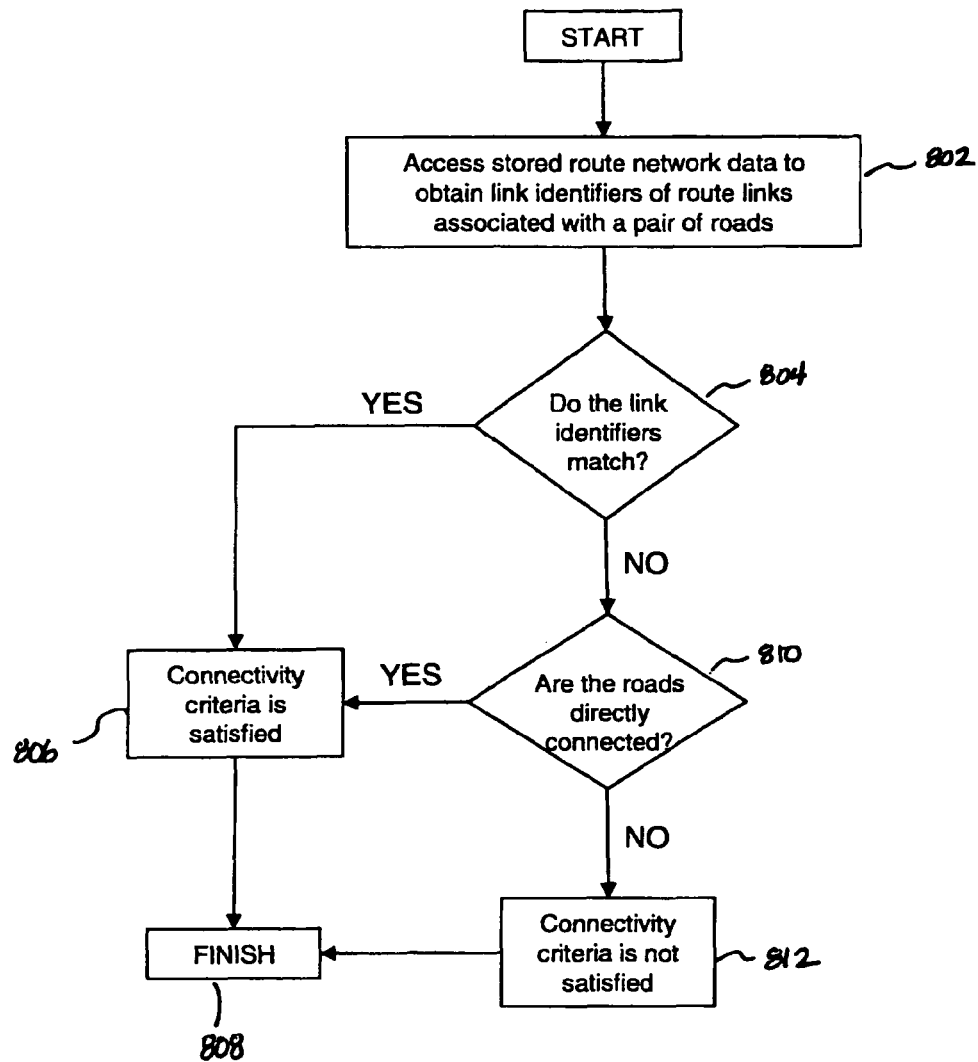
FIG. 8 is a flowchart of an exemplary method for determining whether roads associated with a pair of positions are directly connected, according to an embodiment of the invention.

FIG. 8 illustrates an exemplary method 800 for determining whether roads associated with a pair of positions satisfy certain connectivity criteria, according to an embodiment of the invention. In an embodiment, method 800 may be implemented as a part of step 710 of FIG. 7 to determine whether roads associated with a first and second position are directly connected. However, in additional embodiments, method 800 may be implemented independently to determine whether any two road segments satisfy the certain connectivity criteria and as such, are directly connected.

In FIG. 8, step 802 accesses link identifiers of the route links associated with the pair of roads. As described above in reference to FIG. 7, step 802 may access the stored route network data to obtain link identifiers of the route links associated with the first and second positions.

Step 804 then determines whether the link identifiers for the pair of roads match. If step 804 determines that the obtained link identifiers match, then the connectivity criteria are satisfied for the pair of roads in step 806, and the roads are deemed directly connected. In such an embodiment, each road is associated with the same route link, thereby implying that each of the pair of positions is correlated to the same road segment. Once the connectivity criteria is satisfied in step 806, exemplary method 800 is complete and finishes in step 808.

However, if step 804 determines that the obtained link identifiers do not match, then each of the pair of positions is associated with a different road segment and as such, a different route link. Step 810 then determines whether the road segments associated with the pair of positions are directly connected, i.e., whether the roads intersect. In an embodiment, step 810 accesses stored connectivity information associated with each route link, and subsequently determines whether each pair of roads is connected based on the accessed connectivity information.

If step 810 determines that the candidate roads associated with of the pair of positions are directly connected, i.e., that they intersect, then the connectivity criteria is satisfied in step 806. For example, and in reference to FIG. 5, "P Street" and "14$^{th}$ Street" directly intersect, and as such, links 503 and 505 satisfy the connectivity criteria and are directly connected by node 504. In such an embodiment, method 800 is complete and finished in step 808.

However, if step 810 determines that the roads associated with of the pair of positions do not intersect, and as such, are not directly connected, then the connectivity criteria is not satisfied in step 812. For example, and in reference to FIG. 5, "P Street" does not directly intersect "K Street," and as such, links 503 and 517 fail to satisfy the connectivity criteria and are not directly connected. In such an embodiment, method 800 is complete and finished in step 808.

Referring back to FIG. 7, if step 712 determines that the selected roads are not directly connected (e.g., that the connectivity criteria of FIG. 8 are not satisfied), step 714 discards the road selected for the second position. Step 716 then determines whether additional roads remain in the set of candidate roads associated with the second position.

If step 716 determines that additional roads remain in the set of candidate roads associated with the second position, then method 700 passes back to step 708. Step 708 selects an additional road from the set of candidate roads associated with the second position, and indexes this selected candidate road against stored route network data to identify a route link associated with the additional road. In an embodiment, the selected candidate road may represent that remaining road within the set of candidate roads that is closest to the second position, as described above.

However, if step 716 determines that no roads remain within the set of candidate roads associated with the subsequent position, then step 718 discards the second position, and method 700 passes back to step 708, which selects a new second data element having a corresponding second position from within the received positional information for further processing.

In such an embodiment, the newly-selected data element may immediately follow the data element corresponding to the discarded position. However, in additional embodiments, the newly-selected data element may be separated from the discarded element by a specified number of elements, by a specified period of time, e.g., a number of seconds, or any combination thereof without departing from the spirit of scope of the invention.

However, if step 712 determines that the candidate roads are directly connected (e.g., that the connectivity criteria of FIG. 8 are satisfied), then step 720 stores the corresponding route link or links, along with any corresponding linking node. Step 722 then determines whether additional positions within the received positional information require processing.

If step 722 determines that additional positions within the received positional information require correlation with the stored map and route network data, then step 724 sets the second position, selected above in step 710, as a new first position. Method 700 then loops back to step 708, which selects a new second data element having a corresponding second position, and identifies a set of candidate roads that are proximate to the new second position, as described above.

However, if step 722 determines that each position within the received positional information has been correlated with the stored map and route network data, step 726 generates the routing graph corresponding to the received positional information from the stored route links and connecting nodes, and method 700 is complete and finishes in step 728. In an embodiment, step 726 returns the generated routing graph/to step 404 of FIG. 4 for additional processing.

In the embodiments described above, method 700 of FIG. 7 correlates each position in the received positional information with stored map data and stored route network data to identify a road proximate to each position and a route link corresponding to that proximate road. However, conventional GPS receivers, such as those included within GPS-equipped client devices 102 and 112 of FIG. 1, may receive and capture position data at a sampling rate of up to three samples per second. For example, for a path traversed over a sixty-minute interval, a GPS-equipped device receiving three samples per second would capture 10,800 data elements. In such instances, the selection and correlation of positions associated with these data elements may result in computationally-inefficient process for generating the routing graph.

Figure 9:
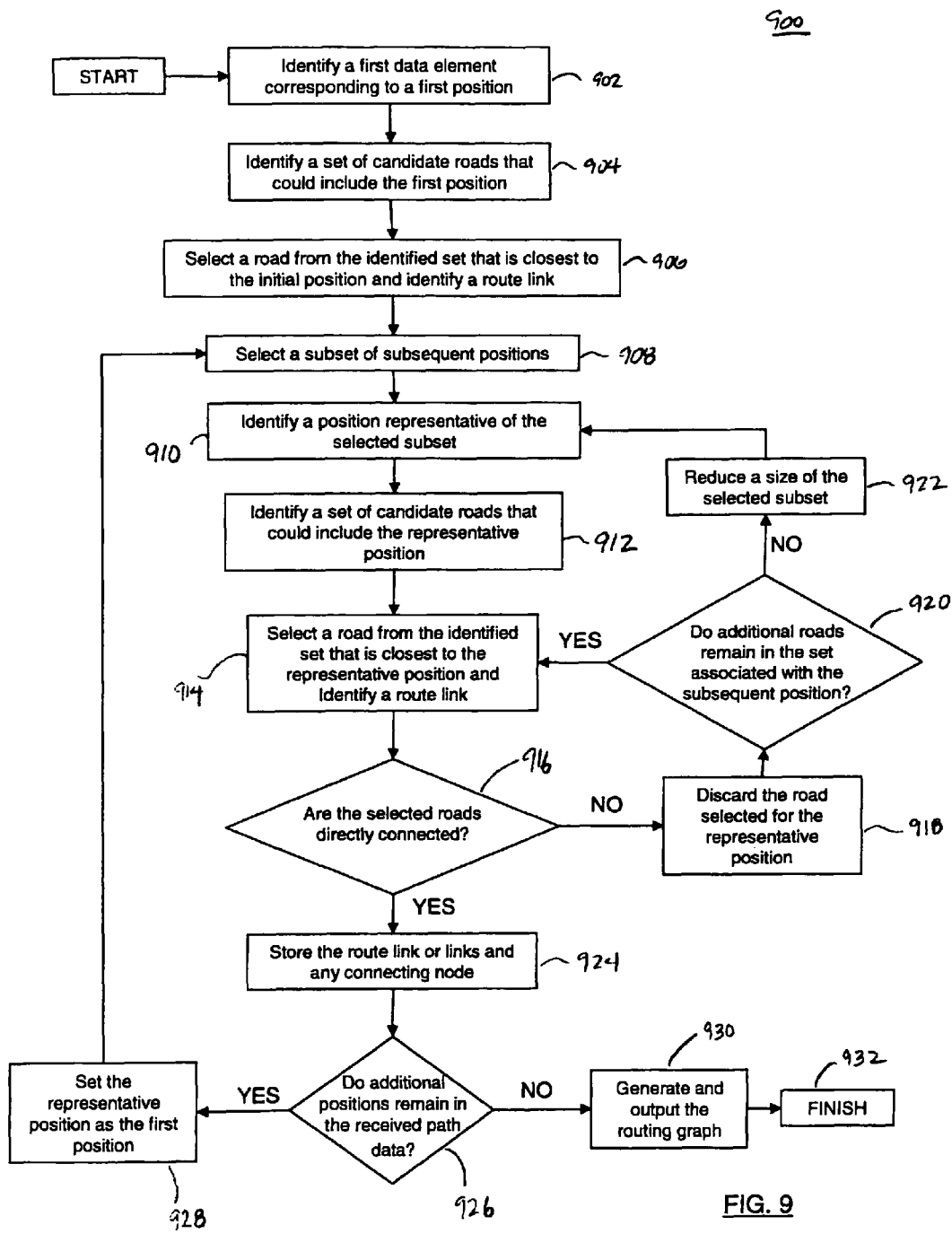
FIG. 9 is a flowchart of an exemplary method for generating a routing graph based on subsets of positional information, according to an additional embodiment of the invention.

FIG. 9 illustrates an exemplary method 900 for generating a routing graph based on subsets of received positional information, according to an embodiment of the invention. In an embodiment, and similar to method 700 of FIG. 7, method 900 may be implemented as part of step 404 of FIG. 4 to correlate received positional information with stored map and route network data to generate a routing graph. However, in an additional embodiment, method 900 may be implemented independently to generate a routing graph corresponding to any additional or alternate set of position data.

However, in contrast to the exemplary methods of FIG. 8, method 900 generates the routing graph based not on the correlation of individual data elements within the received positional information, but on a correlation of subsets of data elements within the received position data. Accordingly, the exemplary methods of FIG. 9 may result in a more computationally efficient generation process when applied to large sets of received positional information, e.g., those captured by GPS-equipped receivers over long periods.

In FIG. 9, step 902 processes the received positional information to identify a first data element, which is associated with a first position captured at a corresponding first time. For example, the first data element may represent an initial data element within the received positional information. e.g., data element 402 of FIG. 4. However, method 900 is not limited to such first data elements, and in additional embodiments, the first data element may represent any additional data element from within the received positional information, e.g., a data element captured at a particular time, without departing from the spirit or scope of the invention.

Step 904 then identifies a set of candidate roads within a stored road network, e.g., map data 172 of FIG. 1, that are positioned proximate to the first position (e.g., those roads having corresponding curves or shapes that are proximate to the first position). In an embodiment, the set of candidate roads may include one or more number of roads within the stored road network having any segment falling within a specified threshold distance of the first position. For example, step 904 may compute a separation distance between the first position and at least one position along segments of roads in the stored road network. Step 904 may then include a road in the set of candidate roads when the separation distance associated with that road falls below the specified threshold distance, e.g., ten meters, twenty-five meters, or any additional or alternate distance apparent to one of skill in the art.

Step 906 then selects a road from within the identified set of candidate roads having a minimum separation distance (i.e., the road that is closest to the first position), and subsequently indexes this selected candidate road against stored route network data, e.g., route network data 174 of FIG. 1, to identify a route link associated with the selected road. As described above in reference to FIG. 12, the selected route link may be associated with a link identifier that points to additional information related to the link, as described above.

Once step 906 identifies a route link associated with the first position, step 908 selects a subset of additional data elements from the received positional information for further processing. In an embodiment, the selected subset includes a specified number of additional data elements, for example, fifty data elements, one hundred data elements, or any additional or alternate number of data elements apparent to one of skill in the art, captured at times later than the first data element.

However, the methods of FIG. 9 are not limited to subsets that include a specified number of data elements, and in an additional embodiment, the subset may include data elements received and captured over a specified time period. In such an embodiment, the number of data elements included within the selected subset may be determined by the specified duration and by a sampling rate of the GPS receiver of the GPS-equipped client device.

Step 910 then identifies a position representative of the selected subset of data elements. In an embodiment, the representative position may be associated with a final data element within the selected subset. For example, if the selected subset includes fifty positions, the representative position may be that associated with the fiftieth data element. However, in additional embodiments, the position representative of the selected subset may be associated with a first data element within the selected subset, or any other data elements within the selected subset apparent to one of skill in the art. Moreover, one or more of a size of the subset of data elements, or a representative position within the subset, may be determined adaptively in response to the correlation process.

Step 912 then identifies a set of candidate roads that are proximate to the representative position (e.g., those roads having corresponding curves or shapes that are proximate to the representative position). As described above, step 912 may compute a separation distance between the representative position and at least one position along segments of roads in the stored road network. Step 912 may include a road in the set of candidate roads when the separation distance associated with that road falls below a specified threshold distance, e.g., ten meters, twenty-five meters, or any additional or alternate distance apparent to one of skill in the art.

Step 914 selects the road from within the identified set of candidate roads having a minimum separation distance (i.e., the road that is closest to the representative position). Step 914 also indexes this selected candidate road against stored route network data, e.g., route network data 174 of FIG. 1, to identify a route link associated with the road selected for the second position. As described above, step 912 may match a road name of road selected for the representative position with a road name and/or an alternate road name within the stored route network data to identify the corresponding route link.

Moreover, as described above, the identification of a route link in step 912 may also determine whether a travel direction associated with the identified route link matches a travel direction at the representative position in the received positional information. In an embodiment, step 912 may select an alternate road from within the set of candidate roads having a direction that matches the travel direction of the representative position. However, in additional embodiments, the determination and remediation of directional mismatches are predicated on a nature of the received positional information, as described above in reference to FIG. 7.

Step 916 then determines whether the road associated with the representative position, as selected in step 914, is directly connected to the road associated with the initial position, e.g., as selected in step 904. As described above in reference to FIG. 7, step 916 deems the selected roads to be directly connected when certain connectivity criteria are satisfied. In such an embodiment, method 800 of FIG. 8, described above, may be implemented as a part of step 914 to determine whether the certain connectivity criteria are satisfied, and hence, whether the selected roads are directly connected.

If step 916 determines that the selected roads are not directly connected, then step 918 discards the selected road associated with the representative position. Step 920 then determines whether additional roads remain within the set of candidate roads associated with the representative position.

If step 920 determines that additional roads remain in the set of candidate roads, then method 900 passes back to step 914, which selects an additional road from within the set of candidate roads associated with the representative position. For example, the additional road may be that remaining road within the set of candidate roads having a minimum separation distance.

However, if step 920 determines that no roads remain within the set of candidate roads, step 922 reduces a size of the selected subset, and method 900 then passes back to step 910, which identifies a position representative of the newly-reduced subset of positions. In an embodiment, step 920 may reduce the size of the selected subset by twenty-five percent, fifty percent, or by any additional or alternate factor apparent to one of skill in the art. In such an embodiment, a position representative of the reduced subset may be temporally closer to the initial position, thereby increasing a likelihood that a road approximating the new representative position may intersect a road approximating the initial position.

However, if step 916 determines that the candidate roads are directly connected, i.e., that the connectivity criteria is satisfied, then the corresponding route link or links are stored in step 924, along with any corresponding linking node. Step 926 then determines whether additional positions within the received positional information require processing.

If step 926 determines that additional positions within the received positional information require correlation with the stored map and route network data, then step 928 sets the representative position, selected above in step 910, as a new first position, and method 900 loops back to step 908. Step 908 then selects a subset of additional data elements from the received positional information, as described above.

However, if step 926 determines that each position within the received positional information has been correlated with the stored map and route network data, step 930 generates the routing graph corresponding to the received positional information from the stored route links and connecting nodes, and method 900 is complete and finishes in step 932. In an embodiment, step 930 returns the generated routing graph to step 404 of FIG. 4 for additional processing.

In the embodiments described above, a position associated with a data element is correlated against stored map data to identify a candidate set of roads that are proximate to the position. However, the present invention is not limited to such correlations, and in additional embodiments, correlations of prior positions along a single road may be used to adaptively identify roads that are proximate to a future position. Such an adaptive identification can, in certain situations, reduce the computational effort necessary to generate a routing graph corresponding to a received set of positional information.

Figure 10:
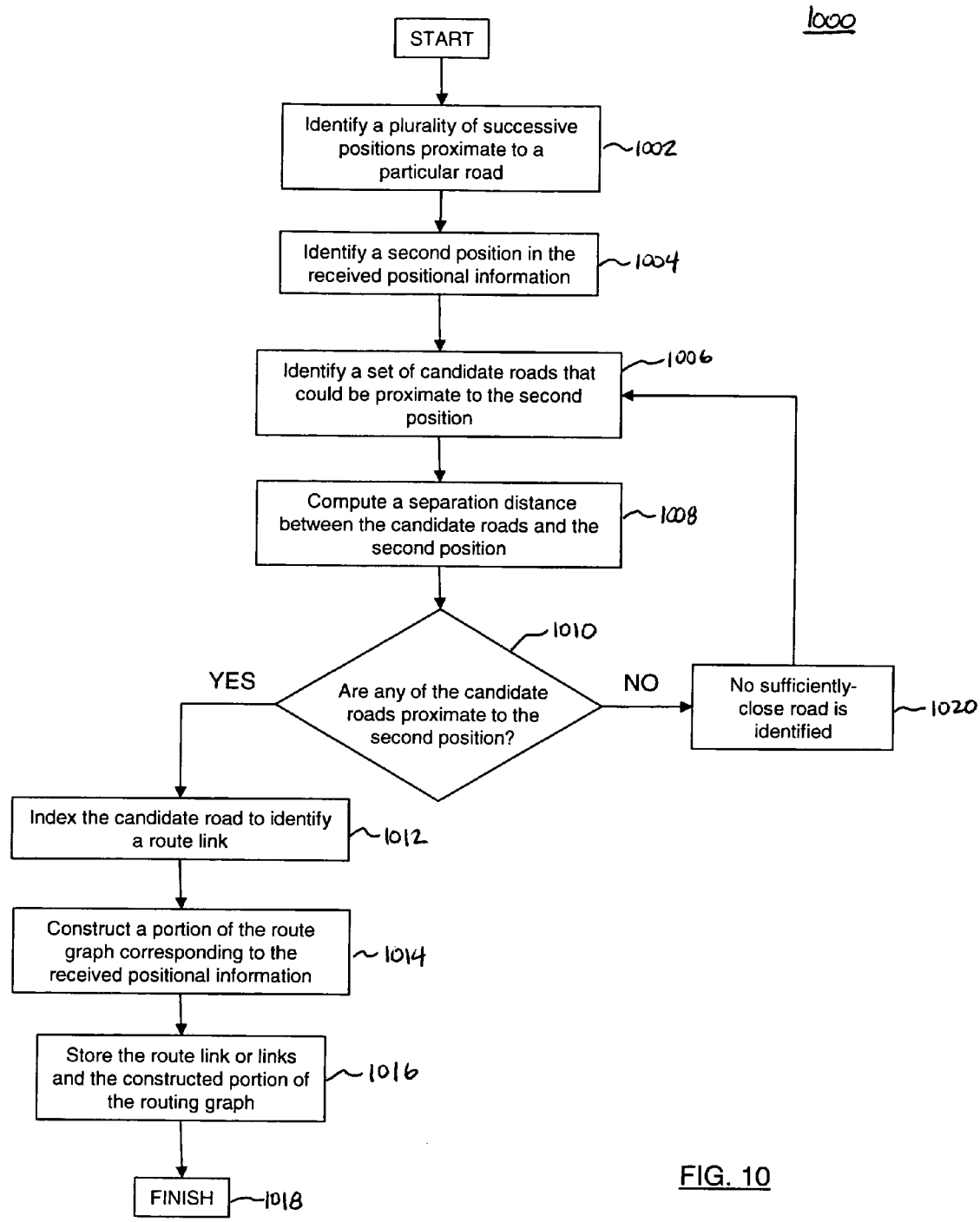
FIG. 10 is a flowchart of an exemplary method for generating portions of a routing graph based on previously-correlated positional information, according to an embodiment of the invention.

FIG. 10 illustrates an exemplary method 1000 for generating portions of a routing graph based on previously-correlated position data, according to an embodiment of the invention. In an embodiment, exemplary method 1000 may be implemented as in conjunction with the exemplary methods of FIGS. 7 and 9 to identify candidate road or road segments that may be proximate to a position and to construct portions of routing graphs that are associated with this position. However, in additional embodiments, exemplary method 1000 may be used to independently generate a portion of a routing graph associated with a subsequent position based on correlations of prior positions.

In FIG. 10, step 1002 identifies a plurality of successive positions within a set of received positional information that are proximate to a particular road. In an embodiment, the successive positions may represent positions associated with successively-data elements in a set of received positional information, as described above in reference to FIG. 7. Additionally or alternatively, the successive positions may be positions representative of subsets of received positional information, as described above in reference to FIG. 9. In such embodiments, exemplary methods of FIGS. 7 and 9 may be implemented to identify a shared route link common with each of the first positions identified in step 1002, and further, a direction of travel associated with the shared route link.

Step 1004 then identifies a second position in the received positional information that, in an embodiment, was captured later than those positions identified in step 1002. For example, the second position may immediately follow the positions identified in step 1002, may be separated from the identified position by a specific time period or a specified number of data elements, or may be representative of an additional subset of data elements in the received positional information, as described above in reference to FIG. 9.

Once the second position is identified, step 1006 then identifies a set of candidate roads within a stored road network, e.g., map data 172 of FIG. 1, that may be proximate to the second position (e.g., those roads having corresponding curves or shapes that are proximate to the second position). In an embodiment, the identified set of candidate roads may include one or more roads that intersect the particular road (i.e., that road proximate to the successive positions identified in step 1002) along the direction of travel associated with the particular road.

For example, and in reference to routing graph 500 of FIG. 5, step 1002 may identify a plurality of positions proximate to "$14^{th}$ St.," e.g., link 505, and may determine that these positions are associated with a "southbound" direction of travel. In response to a second position identified in step 1004, step 1006 may then propose one or more candidate roads that intersect "$14^{th}$ St." at positions south of the identified plurality of positions.

Step 1008 then computes a separation distance between each candidate road proposed in step 1006 and the second position, as described above. In an embodiment, the separation distance computed in step 1008 for each candidate road may represent a distance between the second position and at least one position along the candidate road, e.g., along a curve or shape associated with the candidate road. Based on the computed separation distances, step 1010 then determines whether any of the proposed candidate roads are proximate to the second position.

In an embodiment, the determination in step 1010 selects that road within the proposed candidate roads having a minimum separation distance (i.e., the candidate road that is closest to the second position). Step 1010 then compares the minimum separation distance of the identified candidate road with a specified threshold distance, for example, ten meters, twenty meters, or any additional or alternate distance apparent to one of skill in the art. If the minimum separation distance associated with the road selected in step 1010 is smaller than the specified threshold distance, then step 1010 may identify that selected road as proximate to the second position.

Further, as described above, the determination in step 1010 may also be based on a comparison between a travel direction associated with the second position and a travel direction associated with the identified candidate road. In such an embodiment, if a directional mismatch occurs between the identified candidate road and the second position, step 1010 may discard the indentified candidate position and select another proposed candidate road, e.g., that remaining candidate road having a minimum separation distance. Additionally, as described above, the remediation of a directional mismatch in step 1010 may be predicated on a nature of the received positional information.

If step 1010 determines the identified candidate road is proximate to the second position, then step 1012 indexes the candidate road against stored route network data to identify a route link associated with that identified candidate road. For example, step 1012 can match a name of the identified candidate road with a road name and/or alternate road name or a route link to identify the route link, as described above.

Step 1014 then constructs a portion of the routing graph corresponding to the received positional information by linking together the route links associated with the identified successive positions and the second position. For example, if the route link identified in step 1012 directly intersects that route link associated with successive positions identified in step 1002, then step 1014 may link these route links together at a node, as described above in reference to FIGS. 7 and 9.

However, the route link identified in step 1012 may not directly intersect the route link associated with the successive positions identified in step 1002. For example, in reference to routing graph 500 of FIG. 5, route link 503 never directly intersects route link 517. In such an embodiment, step 1014 may string together directly-connected route links between the route links identified in steps 1002 and 1012 to generate a portion of a routing graph that describes a route between the identified successive positions and the second position.

Step 1016 then stores the route link identified in step 1012 and the portion of the routing graph constructed in step 1014. Method 1000 is then complete and finished in step 1018. In an embodiment, method 1000 could pass back to step 720 of FIG. 7 and step 924 of FIG. 9, which determine whether additional positions within the received positional information require processing.

However, if step 1010 determines that none of the proposed roads or road segments are proximate to the second position, then method 1000 is unable to identify a proximate road in step 1020. In such an embodiment, method 1000 could pass back to step 1006, which may propose an additional set of candidate roads for processing. For example, step 1006 could propose an increased number of candidate roads, and additionally or alternatively, step 1006 could expand a geographic region from which these candidate roads are selected.

The embodiments of FIG. 10 are described in terms of a single, second position. However, method 1000 is not limited to the correlation of map data to a single second position, and in an additional embodiment, method 1000 may be applied to any plurality of second positions to identify route links without departing from the spirit or scope of the invention.

Figure 11:
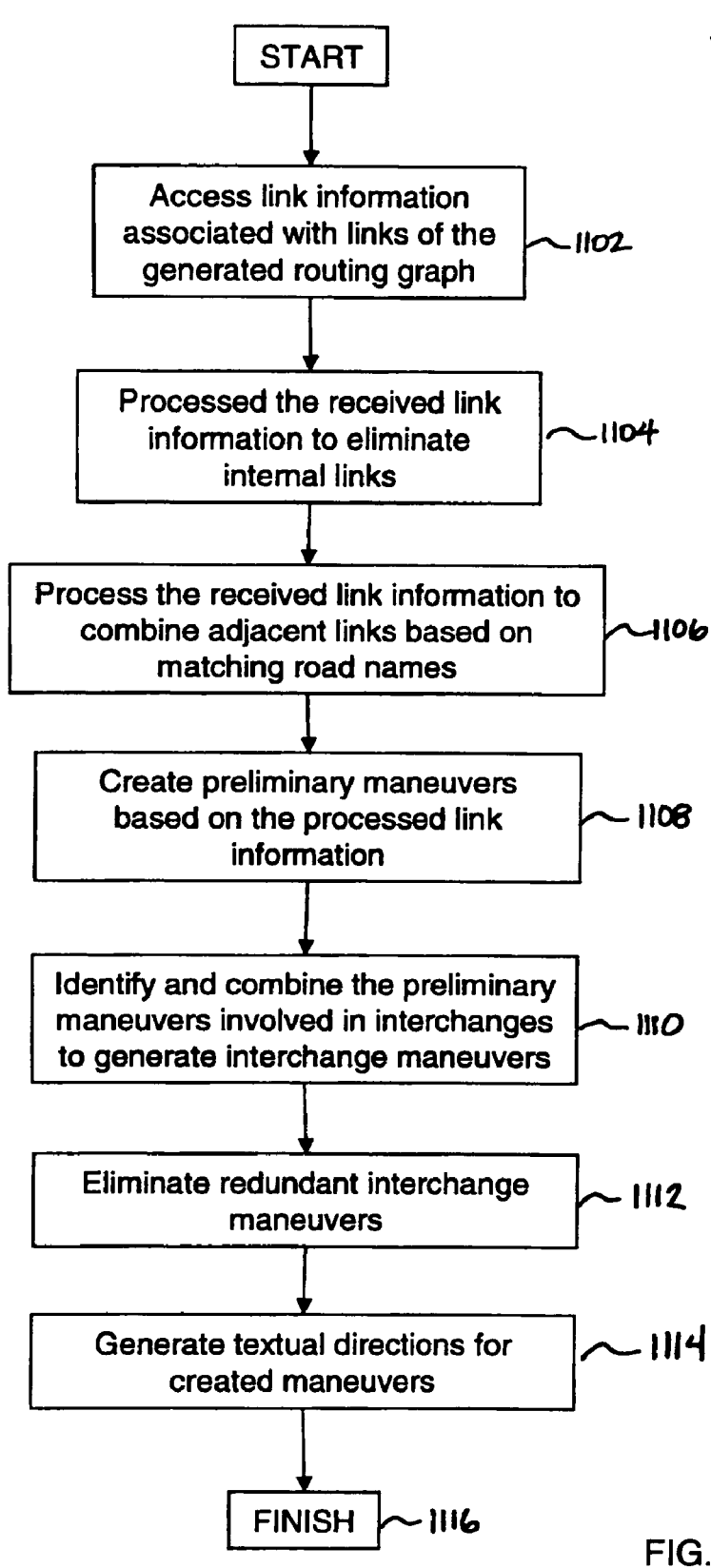
FIG. 11 is a flowchart of an exemplary method for generating textual directions based on a routing graph, according to an embodiment of the invention.

FIG. 11 illustrates an exemplary method 1100 for generating textual directions based on a routing graph, according to an embodiment of the invention. In an embodiment, method 1100 is implemented as part of step 406 of FIG. 4 to generate textual directions based on a routing graph corresponding to the received positional information. However, in an additional embodiment, method 1100 may be independently implemented to generate a set of textual directions for traversing a path corresponding to any additional or alternate routing graph.

In FIG. 11, step 1102 accesses link information corresponding to one or more links of a routing graph, e.g., routing graph 600 of FIG. 6. In an embodiment, step 1102 receives a list of links associated with the particular routing graph and, using the list of links, accesses stored route network data associated with the list of links. However, in an additional embodiment, step 1102 may directly receive link information associated with the one or more links of the particular routing graph, and as such, need to access the stored network route data.

Step 1104 then processes the link information to eliminate internal links from within the generated routing graph. In an embodiment, step 1104 identifies internal links based on an internal link indicator in the received link information, e.g., internal link indicator 1286 in FIG. 12. Step 1104 may then eliminate the identified internal links by combining the information about the internal links with information associated with one or more non-internal links. For example, step 1104 may combine the link information for the internal links with corresponding link information for a previous link or a subsequent link.

Step 1106 then processes alternate road names of the remaining links of the generated routing graph to eliminate redundant links. In an embodiment, step 1106 may compare whether a road name, or an alternative road name, of one link matches a road name, or an alternate road name, of an adjacent link. If the names, or alternate road names, of adjacent links match, step 1106 then determines whether one of the adjacent links involves a turn. If neither adjacent link involves a turn, then step 1106 combines the adjacent links into a single link.

Step 1108 then creates preliminary maneuvers from the processed links and corresponding link information. In an embodiment, step 1108 combines one or more links to generate a preliminary maneuver, and generates corresponding preliminary maneuver information based on link information of the one or more links. In such embodiments, maneuver information may be structured in a fashion similar to the link information described above with respect to FIG. 12. Further, when a link has been combined with one or more other links, e.g., through a combination of internal links or matching road names or alternate road names, step 1108 may generate only a single preliminary maneuver for the combined link information.

Once preliminary maneuvers are created in step 1108, step 1110 identifies and combines preliminary maneuvers that are involved in a highway interchange into a single maneuver. The resulting combined maneuvers, referred to as "interchange maneuvers," describe entrances or exits associated with a limited-access road. As described above, the limited access road may be a fully controlled limited-access road or a partially-controlled limited-access road.

Step 1112 then eliminates redundant interchange maneuvers from the set of preliminary maneuvers. For example, step 1112 may eliminate an interchange maneuver when the road name or the alternate road name of the maneuver is the same as a previous maneuver.

Step 1114 then generates textual directions for the created maneuvers, e.g., textual directions 600 of FIG. 6. In an embodiment, step 1114 may generate textual directions that include, but are not limited to, phrases such as "continue to follow," and "merge." Further, such generated directions may identify a particular road name or a road number when a maneuver includes multiple road names, when the maneuver includes a turn (e.g., a left turn or a right turn), or when two links that share a road name or an alternate road name have been combined to form the maneuver. Further, for example, the generates directions may also specify a distance travelled while executing each created maneuver.

Method 1100 is then complete and finishes in step 1116. In an embodiment, step 1114 may output the generated textual directions to step 406 of FIG. 4, which may subsequently store and or display the textual directions.

Although the processes of FIG. 11 has been disclosed for purposes of generating textual directions from a routing graph and corresponding link information, embodiments of the present invention are not limited to such exemplary processes. In additional embodiments, the generation of textual directions from routing graphs may be implemented using one or more additional or alternate processes, such as those described in U.S. Pat. No. 7,283,906 to Gearhart, which issued on Oct. 16, 2007.

Various embodiments have been described herein with reference to the accompanying drawings. It will, however, be evident that various modifications and changes may be made thereto, and additional embodiments may be implemented, without departing from the broader scope of the invention as set forth in the claims that follow.

Further, other embodiments will be apparent to those skilled in the art from consideration of the specification and practice of one or more embodiments of the invention disclosed herein. It is intended, therefore, that this disclosure and the examples herein be considered as exemplary only, with a true scope and spirit of the invention being indicated by the following listing of exemplary claims.

What is claimed is:

1. A computer-implemented method for generating textual directions based on positional data, the method comprising the following steps, performed by one or more processors:

receiving positional information comprising a plurality of positional data elements, the plurality of positional data elements specifying corresponding longitudes and latitudes at corresponding ones of a plurality of times;

processing the received information to generate a routing graph, the routing graph comprising a plurality of nodes and one or more route links that connect the nodes, the one or more route links being associated with corresponding link information, wherein the processing comprises:

identifying, from the received information, a first data element and a second data element, the time specified by the first data element being subsequent to the time specified by the second data element;

selecting a first road corresponding to the longitude and latitude specified by the first data element, and a second road corresponding to the longitude and latitude specified by the second data element;

determining whether the first and second roads correspond to a common route link, based on at least a portion of the link information; and constructing a portion of the routing graph that includes the common route link, when the first and second roads correspond to the common route link; and generating, based on the corresponding link information, textual directions for traversing a path representative of the routing graph.

2. The method of claim 1, wherein the processing further comprises:

correlating the first and second roads with stored information to identify first and second route links associated with corresponding ones of the first and second roads;

determining whether the first road intersects the second road; and constructing a portion of the routing graph that includes the identified route links when the first and second roads intersect, the identified route links being connected within the routing graph by a corresponding one of the nodes.

3. The method of claim 2, wherein the correlating comprises:

accessing the link information associated with the identified route links, the link information comprising connectivity information.

4. The method of claim 3, wherein the determining comprises:

processing the connectivity information associated with the identified route links to determine whether the first and second roads intersect.

5. The method of claim 2, wherein the determining comprises:
determining that the first and second roads are directly connected when the first and second roads are associated with the same route link.

6. The method of claim 2, wherein correlating comprises:
identifying the route link associated with the second road based on a travel direction associated with the second position.

7. The method of claim 2, further comprising:
discarding the second data element when the first and second roads are not directly connected;
identifying an additional data element from the received positional information; and
selecting a second road associated with the additional data element.

8. The method of claim 2, wherein one or more of the first data element and the second data element are representative of a subset of the plurality of positional data elements.

9. The method of claim 8, further comprising:
reducing a size of the subset represented by the second data element when the first and second roads are not directly connected;
identifying an additional data element that represents the reduced subset; and
selecting a second road associated with the additional data element representative of the reduced subset.

10. The method of claim 1, further comprising:
identifying, from the received positional information, a plurality of first positional data elements and a first road corresponding to positions associated with the plurality of first data elements;
selecting a set of candidate roads that could intersect the first road along a travel direction of the first road;
determining whether a shape of a candidate road of the selected set is proximate to a position associated with a second data element in the received positional information; and
constructing a portion of the routing graph that includes route links associated with first road and the candidate road when the shape of the candidate road is proximate to the position associated with the second positional data element.

11. An apparatus, comprising:
a storage device; and
a processor coupled to the storage device, wherein the storage device stores a program for controlling the processor, and wherein the processor, being operative with the program, is configured to:
receive positional information comprising a plurality of positional data elements, the plurality of positional data elements specifying corresponding longitudes and latitudes at corresponding ones of a plurality of times;
process the received information to generate a routing graph, the routing graph comprising a plurality of nodes and one or more route links that connect the nodes, the one or more route links being associated with corresponding link information, the processor being further configured to:
identify, from the received information, a first data element and a second data element, the time specified by the first data element being subsequent to the time specified by the second data element;
select a first road corresponding to the longitude and latitude specified by the first data element, and a second road corresponding to the longitude and latitude specified by the second data element;
determine that the first and second roads correspond to a common route link, based on at least a portion of the link information; and
construct a portion of the routing graph that includes the common route link, when the first and second roads correspond to the common route link; and
generate, based on the corresponding link information, textual directions for traversing a path representative of the routing graph.

12. The apparatus of claim 11, wherein the processor configured to process is further configured to:
correlate the first and second roads with stored information to identify first and second route links associated with corresponding ones of the first and second roads;
determine whether the first road intersects the second road; and
construct a portion of the routing graph that includes the identified route links when the first and second roads intersect, the identified route links being connected within the routing graph by a corresponding one of the nodes.

13. The apparatus of claim 12, wherein the processor configured to correlate is further configured to:
access the link information associated with the identified route links, the link information comprising connectivity information.

14. The apparatus of claim 13, wherein the processor configured to determine is further configured to:
process the connectivity information associated with the identified route links to determine whether the first and second roads intersect.

15. The apparatus of claim 12, wherein the processor configured to determine is further configured to:
determine that the first and second roads are directly connected when the first and second roads are associated with the same route link.

16. The apparatus of claim 12, wherein the processor configured to process is further configured to:
discard the second data element when the first and second roads are not directly connected;
identify an additional data element from the received positional information; and
select a second road associated with the additional data element.

17. The apparatus of claim 12, wherein one or more of the first data element and the second data element are representative of a subset of the plurality of positional data elements.

18. The apparatus of claim 17, wherein the processor configured to process is further configured to:
reduce a size of the subset represented by the second data element when the first and second roads are not directly connected;
identify an additional data element that represents the reduced subset; and
select a second road associated with the additional data element representative of the reduced subset.

19. The apparatus of claim 11, wherein the processor configured to process is further configured to:
identify, from the received positional information, a plurality of first positional data elements and a first road corresponding positions associated with the plurality of first data elements;

select a set of candidate roads that could intersect the first road along a travel direction of the first road;

determining whether a shape of a candidate road of the selected set is proximate to a position associated with a second data element in the received positional information; and constructing a portion of the routing graph that includes route links associated with first road and the candidate road when the shape of the candidate road is proximate to the position associated with the second positional data element.

20. A tangible, non-transitory computer-readable medium storing instructions that, when executed by a processor, perform a method for generating textual directions based on positional data, the method comprising the steps of:

receiving positional information comprising a plurality of positional data elements, the plurality of positional data elements specifying corresponding longitudes and latitudes at corresponding ones of a plurality of times;

processing the received information to generate a routing graph, the routing graph comprising a plurality of nodes and one or more route links that connect the nodes, the one or more route links being associated with corresponding link information, wherein the processing comprises:

identifying, from the received information, a first data element and a second data element, the time specified by the first data element being subsequent to the time specified by the second data element;

selecting a first road corresponding to the longitude and latitude specified by the first data element, and a second road corresponding to the longitude and latitude specified by the second data element;

determining that the first and second roads correspond to a common route link, based on at least a portion of the link information; and constructing a portion of the routing graph that includes the common route link, when the first and second roads correspond to the common route link; and generating, based on the corresponding link information, textual directions for traversing a path representative of the routing graph.

21. The computer-readable medium of claim 20, wherein the processing further comprises:

correlate the first and second roads with stored information to identify first and second route links associated with corresponding ones of the first and second roads;

determine whether the first road intersects the second road; and construct a portion of the routing graph that includes the identified route links when the first and second roads intersect, the identified route links being connected within the routing graph by a corresponding node.

22. The computer-readable medium of claim 21, wherein the determining comprises:

determining that the first and second roads are directly connected when the first and second roads are associated with the same route link.

23. The computer-readable medium of claim 21, wherein processing further comprises:

discarding the second data element when the first and second roads are not directly connected;

identifying an additional data element from the received positional information; and selecting a second road associated with the additional data element.

24. The computer-readable medium of claim 21, wherein one or more of the first data element and the second data element are representative of a subset of the plurality of positional data elements.

25. The computer-readable medium of claim 24, wherein processing further comprises:

reducing a size of the subset represented by the second data element when the first and second roads are not directly connected;

identifying an additional data element that represents the reduced subset; and selecting a second road associated with the additional data element representative of the reduced subset.

26. The computer-readable medium of claim 20, wherein the correlating comprises:

accessing the link information associated with the identified route links, the link information comprising connectivity information.

27. The computer-readable medium of claim 26, wherein the determining comprises:

processing the connectivity information associated with the identified route links to determine whether the first and second roads intersect.

28. The computer-readable medium of claim 20, wherein the processing further comprises:

identifying, from the received positional information, a plurality of first positional data elements and a first road corresponding positions associated with the plurality of first data elements;

selecting a set of candidate roads that could intersect the first road along a travel direction of the first road;

determining whether a shape of a candidate road of the selected set is proximate to a position associated with a second data element in the received positional information; and constructing a portion of the routing graph that includes route links associated with first road and the candidate road when the shape of the candidate road is proximate to the position associated with the second positional data element.

* * * * *